(12) United States Patent
van Horck et al.

(10) Patent No.: US 11,831,234 B2
(45) Date of Patent: Nov. 28, 2023

(54) NEUTRAL-LESS POWER SUPPLY WITH BUCK CONVERTER

(71) Applicant: eldoLAB Holding B.V., Son en Breugal (NL)

(72) Inventors: Frank van Horck, Son en Breugel (NL); Marc Saes, Son en Breugel (NL)

(73) Assignee: eldoLAB Holding B.V., Son en Breugel (NL)

( * ) Notice: Subject to any disclaimer, the term of this patent is extended or adjusted under 35 U.S.C. 154(b) by 0 days.

(21) Appl. No.: 16/989,288

(22) Filed: Aug. 10, 2020

(65) Prior Publication Data

US 2021/0050783 A1 Feb. 18, 2021

Related U.S. Application Data

(60) Provisional application No. 62/885,410, filed on Aug. 12, 2019.

(51) Int. Cl.
*H02M 1/36* (2007.01)
*H02M 1/00* (2006.01)

(52) U.S. Cl.
CPC ............ *H02M 1/36* (2013.01); *H02M 1/0006* (2021.05)

(58) Field of Classification Search
CPC .................................................. H02M 1/0006
See application file for complete search history.

(56) References Cited

U.S. PATENT DOCUMENTS

| 8,629,631 | B1* | 1/2014 | Rhodes | H02M 1/36 363/19 |
| 2012/0080945 | A1* | 4/2012 | Vasadi | H02M 3/158 307/31 |
| 2018/0159432 | A1* | 6/2018 | Lai | H02M 1/32 |
| 2019/0312512 | A1* | 10/2019 | Takada | H02M 1/36 |

FOREIGN PATENT DOCUMENTS

| EM | 0525898 A2 * | 7/1992 | ............ H02M 3/156 |
| GB | 2534816 A * | 8/2016 | ............ G02F 1/1336 |

OTHER PUBLICATIONS

Keogh, Bernard, "Power Factor Correction Using the Buck Topology-Efficiency Benefits and Practical Design Consdierations". pp. 1-37. (Year: 2011).*

* cited by examiner

*Primary Examiner* — Peter M Novak
(74) *Attorney, Agent, or Firm* — RatnerPrestia

(57) ABSTRACT

Disclosed is a power supply. In an example, the power supply comprises a switched mode power converter. The switched mode power converter comprises an input terminal for receiving an input voltage, and an output terminal for supplying a power to a load. A control unit of the power supply controls a switch of the switched mode power converter. A current-limited power supply powers the control unit, and is connected to the input voltage, whereby the control unit is configured to control an input current to the switched mode power converter.

12 Claims, 4 Drawing Sheets

NEUTRAL-LESS POWER SUPPLY WITH BUCK CONVERTER

RELATED APPLICATIONS

This application is a U.S. Non-Provisional Application claiming the benefit of priority to U.S. Provisional Application No. 62/885,410, filed Aug. 12, 2019, the disclosure of which is entirely incorporated herein by reference for all purposes.

TECHNICAL FIELD

The present invention relates generally to a low-power universal input power supply, and more specifically to a power supply suitable for use with a ground-fault circuit interrupter (GFCI) protected circuit.

BACKGROUND

As more circuits are connected to ground-fault circuit interrupter (GFCI) breakers to add functionality (e.g. IoT devices), reducing circuit cost and complexity may be difficult because of the sensitivity of some GFCI breakers. A GFCI breaker is designed to disconnect a circuit from the AC grid during certain conditions, such as when an imbalance between the input circuit and output circuit is detected, when a short circuit is detected, or when alternate electrical paths can create an electrical fault. GFCI circuits may have varying tolerances and sensitivities. A sensitive GFCI breaker may open under one set of conditions, whereas a less sensitive GFCI breaker may not open under the same set of conditions.

SUMMARY OF THE INVENTION

According to an aspect of the invention, there is provided a power supply comprising:
 a switched mode power converter comprising:
  an input terminal for receiving an input voltage, and
  an output terminal for supplying a power to a load;
 a control unit for controlling a switch of the switched mode power converter;
 a current-limited power supply for powering the control unit, the current-limited power supply being connected to the input voltage;
 whereby the control unit is configured to control an input current to the switched mode power converter.

By controlling the input current to the switched mode power supply, an unwanted or unnecessary opening of a GFCI breaker can be avoided.

DETAILED DESCRIPTION

During power-on, a power supply can experience an excessive inrush current condition. If the power supply is connected to a sensitive GFCI breaker, the inrush current condition may cause the breaker to open, which results in a power disruption to the power supply and to the devices or systems connected to the power supply. If the power supply is connected to a less sensitive GFCI breaker, the breaker may not open. If the breaker does not open, then a person working on the system may experience a mild electric shock, which may startle the person and cause the person to lose their balance. The present invention avoids high inrush current by controlling the operation of a buck converter to limit and shape the input current.

The switcher in a power supply, e.g. a switch in a switched mode power converter of the power supply, may lock up when there is an input power disruption or a maximum load on a low voltage output. The present invention addresses the lock up issue, by monitoring the output of the power supply and controlling a buck converter based on the output.

In the present invention, a power supply is proposed which comprises:
 a switched mode power converter comprising:
  an input terminal for receiving an input voltage, and
  an output terminal for supplying a power to a load;
 a control unit for controlling a switch of the switched mode power converter;
 a current-limited power supply for powering the control unit, the current-limited power supply being connected to the input voltage;
 whereby the control unit is configured to control an input current to the switched mode power converter.

In an embodiment of the present invention, the control unit of the power supply, e.g. a controller or microcontroller unit (MCU) in the power supply, controls the switched mode power converter, e.g. a buck converter, at power up so that switched mode power converter, e.g. the buck converter, begins to operate after the input power is stable. During steady state operation, the control unit or MCU controls the operation of the buck converter to limit and shape the input current so that the root mean square (RMS) value of the input current is low and monitors the output voltage to prevent to open the GFCI.

Figure 1:
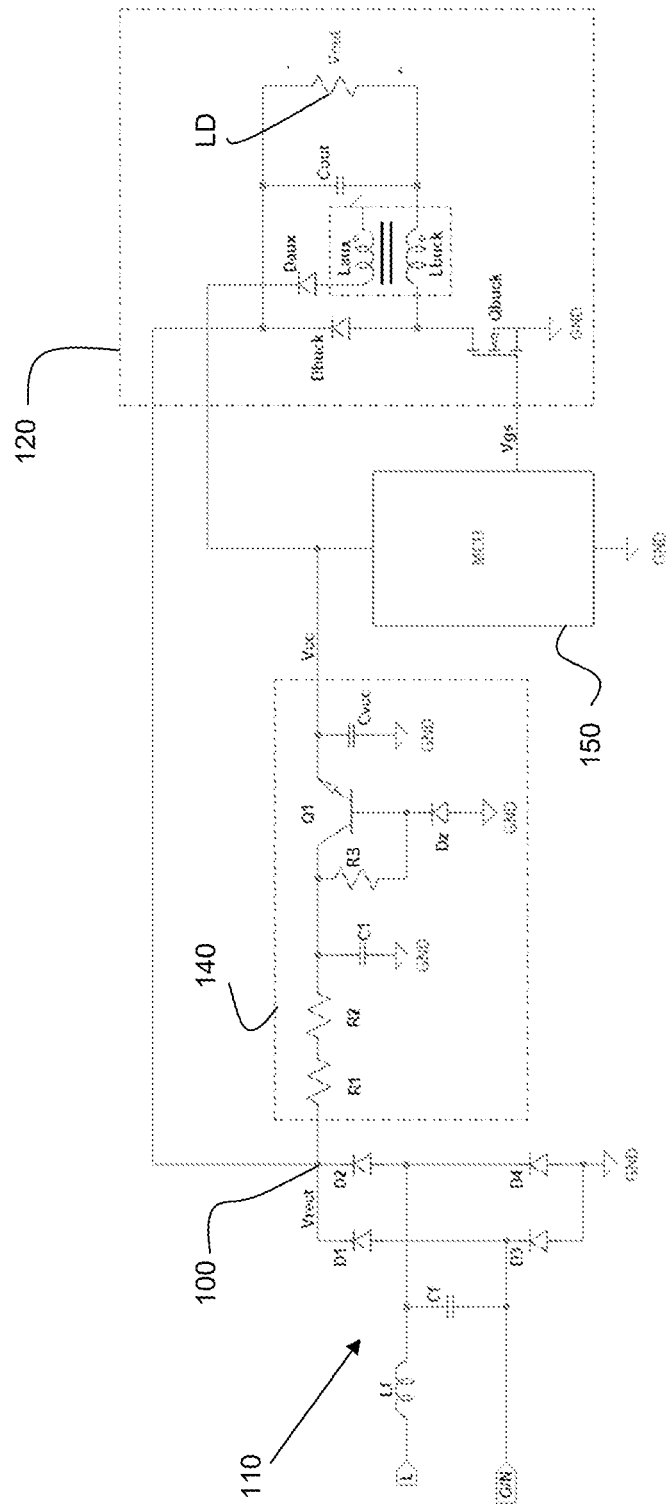
FIG. 1 schematically shows a power supply according to the present invention.

Referring now to the figures, FIG. 1. illustrates an exemplary power supply according to the present invention. The power supply can be considered a low-power universal input power supply. The power supply may be a universal input power supply that is operable across a wide range of AC input voltages, e.g., 100-480 VAC, and across multiple frequencies, e.g., 50-60 Hz. In the embodiment as shown, the power supply includes an AC input circuit, a linear regulator, a controller, and a buck converter.

In general, the power supply according to the present invention, is configured to receive an input voltage at an input terminal of the switched mode power converter of the power supply.

In the embodiment as shown, the input voltage 100 corresponds to a rectified voltage $V_{rect}$, provided by an AC input circuit 110 to the switched mode power converter 120, i.e. a buck converter.

The AC input circuit 110 includes inductor $L_f$, capacitor $C_f$ and diodes D1, D2, D3, and D4. The AC input circuit 110 has input terminals L indicating a line voltage and G/N indicating a ground or neutral connection. The inductor and the capacitor provide input filtering and help limit the inrush current. The diodes form a rectifier and provide a rectified voltage $V_{rect}$ to the linear regulator 130 and the buck converter 120.

The power supply as shown comprises further a linear regulator 140, which can be considered an example of a current-limited power supply, that includes resistors R1, R2, R3, capacitors C1 and $C_{vcc}$, transistor Q1, and zener diode Dz. In some examples, a switched-mode regulator could also be used instead of a linear regulator 140. The buck converter 120 includes inductors, $L_{buck}$ and $L_{aux}$, diodes $D_{buck}$ and $D_{aux}$, MOSFET $Q_{buck}$, and capacitor $C_{out}$. Inductor $L_{aux}$ and diode $D_{aux}$ are part of an auxiliary circuit within the buck converter 120. As shown in FIG. 1, the controller or control unit 150 may be an MCU. An output of the MCU, $V_{gs}$, controls $Q_{buck}$. The load connected at $V_{out}$ is "floating" with regard to the local ground GND in FIG. 1.

During power-up, the linear regulator 140 increases the voltage $V_{cc}$ as the AC input voltage increases. The charging current in the linear regulator 140 is limited by resistors R1, R2. In one example, the value of the resistors is on the order of 1 MΩ and the charging current is limited to 50 μA. Once $V_{cc}$ reaches a sufficient level to power the MCU, the MCU 150 begins operating.

When the MCU 150 begins operating, it uses default parameters, such as a default on-time and a default switching time, to generate $V_{gs}$ and to control the buck converter 120. Once the MCU begins generating $V_{gs}$, the buck convertor 120 begins operating and powers the load LD connected to $V_{out}$ using power from the rectifier.

While the buck converter 120 is operating, the auxiliary circuit in the buck converter 120 provides $V_{cc}$ to the MCU. The linear regulator 140 no longer powers the MCU 150 to reduce the loss of the regulator 140. The energy from auxiliary winding $L_{aux}$, which is coupled to the buck inductor $L_{buck}$ charges capacitor $C_{vcc}$. The voltage at capacitor $C_{vcc}$ corresponds to the output voltage $V_{out}$. For example, the voltage at capacitor $C_{vcc}$ may approximate the output voltage $V_{out}$ but be slightly lower since there is a small voltage drop across the auxiliary diode, $D_{aux}$. in an embodiment of the present invention, the MCU 150 monitors the output voltage $V_{out}$ by monitoring $V_{cc}$ and controls $V_{gs}$ based on the output voltage.

An optional voltage divider may be included in the power supply of FIG. 1. The voltage divider may be connected between the AC input circuit 110 and the linear regulator 140 between $V_{rect}$ and ground. The output of the voltage divider may be provided as an input to the MCU. The MCU can use the output of the voltage divider to monitor the input voltage and can consider the input voltage in addition to the voltage at capacitor $C_{vcc}$ to control $V_{gs}$.

The power supply of FIG. 1 may have a neutral or earth ground return. The neutral return may be appropriate for an installation in new construction and the earth ground return may be appropriate for a retrofit installation. The maximum leakage current for the power supply of FIG. 1 does not exceed 500 μA to earth ground.

Figure 2:
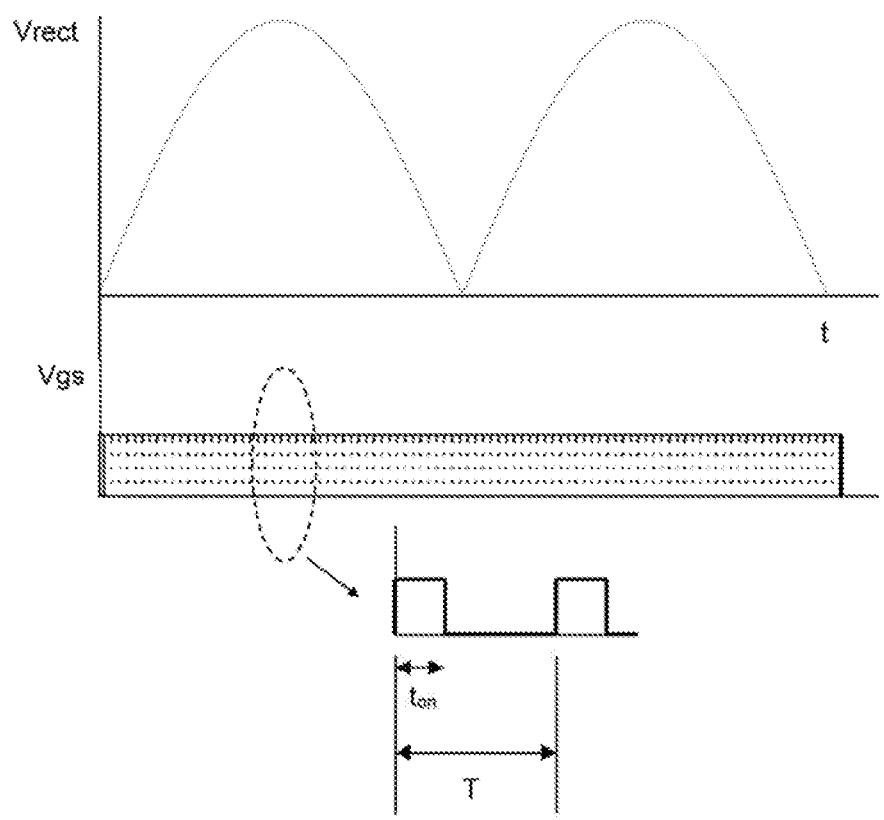
FIG. 2 schematically shows a rectified input voltage and a switch control voltage.

FIG. 2 depicts a plot of $V_{rect}$ and $V_{gs}$. In the particular example of FIG. 2, the pulse width is a constant, however, the MCU may also vary the on-time $t_{on}$ (e.g., the duty cycle $t_{on}/T$) of $V_{gs}$ based on $V_{cc}$ and optionally $V_{rect}$. The operation of the buck converter is determined by the on-time and the switching time T of $V_{gs}$.

Figure 3A:
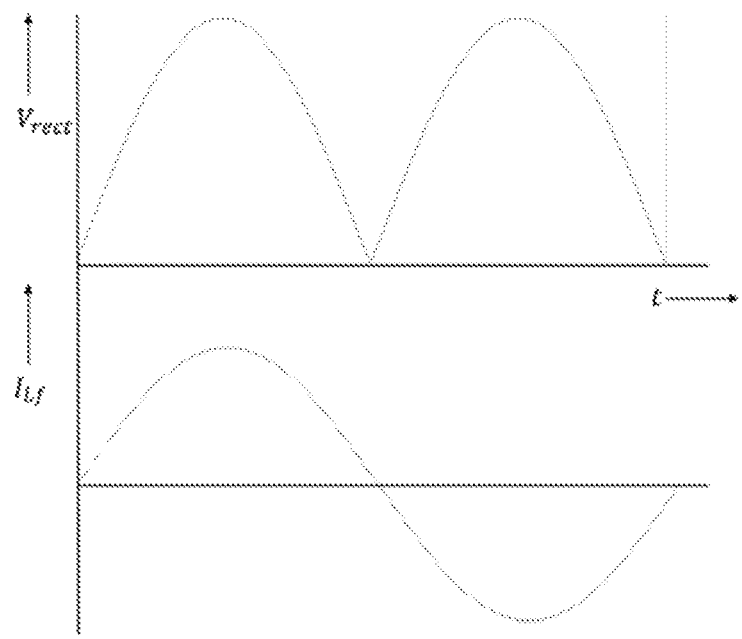
FIGS. 3A and 3B schematically show a rectified input voltage and two possible input currents.

FIG. 3A illustrates a plot of the rectified voltage $V_{rect}$ and a current $I_{Lf}$ in the filtering inductor $L_f$ when the duty cycle and switching time are constant. The input current $I_{Lf}$ is sinusoidal.

Figure 3B:
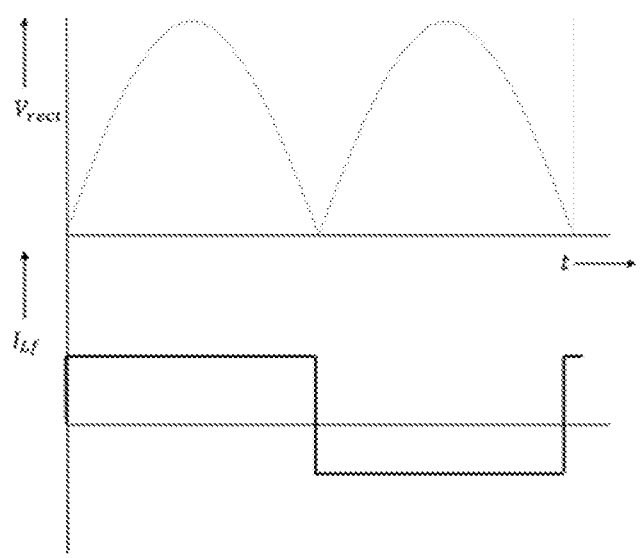

FIG. 3B illustrates how control of the buck converter 120 can limit and shape the input current $I_{Lf}$. FIG. 3B illustrates a plot of the rectified voltage $V_{rect}$ and a current $I_{Lf}$ in the filtering inductor $L_f$ when the duty cycle of $V_{gs}$ changes. The MCU 150 may vary the duty cycle to shape the waveforms from FIG. 3A into the waveforms shown by FIG. 3B. For instance, the duty cycle of $V_{gs}$ approaches a maximum value near the zero crossings of $V_{rect}$ and approaches a minimum value near the peak values of $V_{rect}$. In the particular example illustrated by FIG. 3A, duty cycle and switching time are constant. Other implementations with varying shapes of $I_{Lf}$ are, however, possible. Minimizing the RMS current value through $L_f$ is preferable when the power supply uses an earth ground return. In one example, a peak of $V_{rect}$ is 120 VAC with an on-time between approximately 375 ns and 2.5 μs. In another example, a peak of $V_{rect}$ is 277 VAC with an on-time between approximately 188 ns and 1 μs. In these examples, the switching frequency is approximately 40 kHz. While a square waveform is illustrated in FIG. 3B, other waveforms may be used. The minimum RMS value is obtained for the square waveform shown in FIG. 3B.

Figure 4:
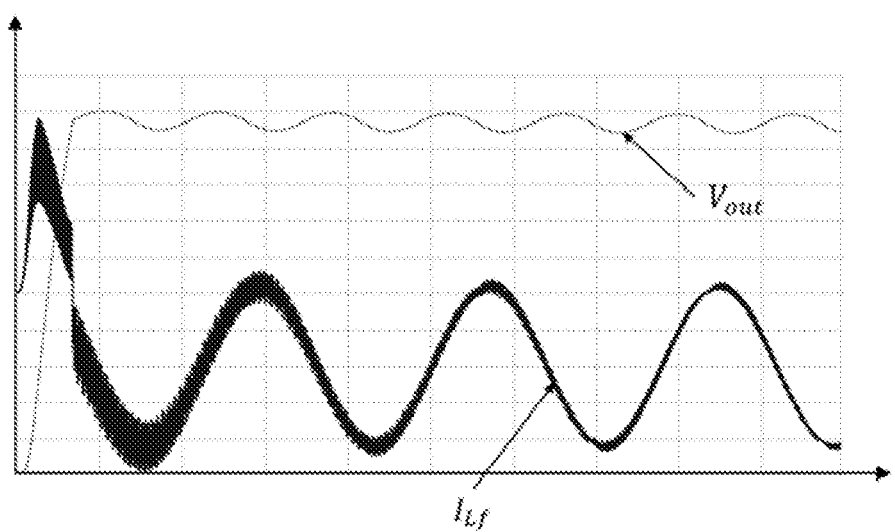
FIG. 4 schematically shows an output voltage of the power supply and an inrush current.

FIG. 4 illustrates a startup cycle of the power supply. FIG. 4 depicts a load voltage $V_{out}$ and a current $I_{Lf}$ in the filtering inductor of the AC input circuit 110. At power-up, the buck converter 120 is in an off state because the MCU 150 is not yet operating. Once $V_{cc}$ is sufficient to power the MCU 150, the MCU 150 begins generating $V_{gs}$ using a default duty cycle and switching time and the buck converter 120 begins operating. Once in steady-state operation, the MCU controls the duty cycle of $V_{gs}$ to limit the input current. In the example, the peak current of $I_{Lf}$ at power-up is approximately double the steady state maximum. As illustrated in FIG. 4, the inrush current is limited while the load voltage $V_{out}$ remains a consistent waveform.

Power supplies such as those described herein may be connected in parallel to a GFCI protected circuit. In one implementation, up to four power supplies according to the present invention may be connected in parallel to a circuit with a sensitive GFCI breaker. The power supply limits the inrush current so that the GFCI breaker does not trip during power-up due to excessive inrush current and the control unit or controller 150 of the power supply controls the switched mode power converter, e.g. buck convertor 120, so that the buck convertor 120 does not lock up due to power disruptions or when there is a maximum load on a low voltage output.

Although the foregoing describes exemplary implementations, other implementations are possible. It will be appreciated that those skilled in the art, upon attaining an understanding of the foregoing, may readily produce alterations to, variations of, and equivalents to, the described aspects. Accordingly, it should be understood that the present disclosure has been presented for purposes of example rather than limitation and does not preclude inclusion of such modifications, variations, and/or additions to the present subject matter as would be readily apparent to one of ordinary skill in the art.

What is claimed is:

1. A power supply comprising:
   a switched mode power converter comprising:
   an input terminal for receiving an input voltage, and
   an output terminal for supplying a power to a load;
   a control unit for controlling a switch of the switched mode power converter; and
   a current-limited power supply for powering the control unit, the current-limited power supply being connected to the input voltage of the switch mode power converter,
   whereby the control unit is configured to control an input current to the switched mode power converter,
   wherein the switched mode power supply comprises a Buck converter, a Boost converter, or a Buck/Boost converter, wherein the switched mode power supply comprises an inductor, wherein the current-limited power supply is configured to power the control unit by charging a capacitor connected to the control unit, wherein the switched mode power converter comprises an auxiliary circuit including an auxiliary inductor and a diode, the auxiliary circuit being configured to power the control unit by charging the capacitor connected to the control unit, wherein the auxiliary inductor is magnetically coupled to the inductor of the switch mode power converter, and wherein the current-limited power supply is further configured to power the control unit only during a start-up or a power-up, and the auxiliary inductor of the auxiliary circuit is configured to power the control unit after the start-up or after the power-up.

2. The power supply according to claim 1, wherein the control unit is configured to limit an RMS value of the input current to remain below a predetermined value.

3. The power supply according to claim 2, wherein the control unit is further configured to shape the input current.

4. The power supply according to claim 1, wherein the current-limited power supply comprises a linear regulator.

5. The power supply according to claim 4, wherein the linear regulator comprises one or more resistors for limiting an input current to the linear regulator and a capacitor.

6. The power supply according to claim 5, wherein the capacitor is configured to be charged by at least part of the input current to the linear regulator and wherein the capacitor is configured to supply power to the control unit.

7. The power converter according to claim 1, wherein the current-limited power supply comprises a switched mode regulator.

8. The power supply according to claim 1, wherein the auxiliary circuit is configured to charge the capacitor of the current-limited power supply, the capacitor being configured to power the control unit.

9. The power supply according to claim 8, wherein the control unit is configured to monitor an output voltage of the power supply based on a voltage of the capacitor.

10. The power supply according to claim 9, wherein the control unit is configured to control the switch of the switched mode power converter, based on the voltage of the capacitor.

11. The power supply according to claim 10, wherein the input voltage is a rectified AC voltage.

12. The power supply according to claim 11, further comprising an AC input circuit for converting an AC input voltage to the rectified AC voltage.

* * * * *